US010740410B2

(12) United States Patent
Kim et al.

(10) Patent No.: US 10,740,410 B2
(45) Date of Patent: *Aug. 11, 2020

(54) METHOD FOR ADDING A COMMENT TO INTERACTIVE CONTENT BY REPRODUCING THE INTERACTIVE CONTENT IN ACCORDANCE WITH A BRACHED COMMENT SCENARIO

(71) Applicant: STUDIO XID KOREA, INC., Seoul (KR)

(72) Inventors: Soo Kim, Hwaseong-si (KR); Jae Won Song, Seoul (KR)

(73) Assignee: STUDIO XID KOREA, INC., Seoul (KR)

( * ) Notice: Subject to any disclaimer, the term of this patent is extended or adjusted under 35 U.S.C. 154(b) by 191 days.

This patent is subject to a terminal disclaimer.

(21) Appl. No.: 16/156,684

(22) Filed: Oct. 10, 2018

(65) Prior Publication Data

US 2019/0042569 A1    Feb. 7, 2019

Related U.S. Application Data

(63) Continuation of application No. 15/395,626, filed on Dec. 30, 2016, now Pat. No. 10,127,216.

(51) Int. Cl.
*H03M 7/24* (2006.01)
*H03H 17/00* (2006.01)
(Continued)

(52) U.S. Cl.
CPC ............ *G06F 16/93* (2019.01); *G06F 40/169* (2020.01); *H04L 67/12* (2013.01);
(Continued)

(58) Field of Classification Search
CPC .... G06F 16/93; G06F 16/9535; G06F 3/0481; G06F 3/0482; G06F 3/0484;
(Continued)

(56) References Cited

U.S. PATENT DOCUMENTS 6,340,977 B1    1/2002  Lui et al.
8,429,582 B1 *  4/2013  Lai ..................... G06F 30/398
                                                  716/112
(Continued)

FOREIGN PATENT DOCUMENTS

JP    2003-087762 A    3/2003
JP    2006-352779 A   12/2006
(Continued)

OTHER PUBLICATIONS

An Office Action issued by the Korean Patent Office dated Jul. 13, 2017, which corresponds to Korean Patent Application No. 10-2016-0184074 and is related to U.S. Appl. No. 15/395,626.

*Primary Examiner* — Cesar B Paula
*Assistant Examiner* — Luu-Phuong T Nguyen
(74) *Attorney, Agent, or Firm* — Studebaker & Brackett PC

(57) ABSTRACT

Disclosed are methods and apparatus for commenting on interactive content. One of the methods includes reproducing the interactive content in accordance with a branched scenario including a plurality of branches, each of which is matched to a trigger, receiving a touch input for inputting a comment on the interactive content, selecting a comment target trigger from the triggers, matching the comment to the selected comment target trigger, determining a comment target object, which is an object located closest to a touch point at the time when the touch input is made among candidate objects related to the comment target trigger, the candidate objects comprise objects of a response being reproduced at the time when the touch input is made, among all responses of the comment target trigger; and transmitting comment information comprising information of the comment target trigger, a trigger log and content data of the comment.

16 Claims, 12 Drawing Sheets

(51) Int. Cl.
*G06F 16/93* (2019.01)
*H04L 29/06* (2006.01)
*H04L 29/08* (2006.01)
*G06F 40/169* (2020.01)
*H04L 12/58* (2006.01)
*G06F 16/9535* (2019.01)
*G06F 3/0483* (2013.01)
*G06F 3/0481* (2013.01)
*G06F 3/0482* (2013.01)
*G06F 3/0484* (2013.01)
*G06F 3/0488* (2013.01)

(52) U.S. Cl.
CPC .......... *H04L 67/2804* (2013.01); *H04L 67/42* (2013.01); *G06F 3/0481* (2013.01); *G06F 3/0482* (2013.01); *G06F 3/0483* (2013.01); *G06F 3/0484* (2013.01); *G06F 3/0488* (2013.01); *G06F 16/9535* (2019.01); *H04L 51/32* (2013.01)

(58) Field of Classification Search
CPC . G06F 3/0488; G06F 40/169; H04L 67/2804; H04L 67/42; H04L 67/12; H03M 7/24; H03H 17/00
USPC .......................................................... 715/230
See application file for complete search history.

(56) References Cited

U.S. PATENT DOCUMENTS

| | | |
|---|---|---|
| 9,118,723 B1 | 8/2015 | Su et al. |
| 2003/0182627 A1 | 9/2003 | Chung et al. |
| 2009/0077479 A1* | 3/2009 | Tucci ...................... G09B 7/04 715/764 |
| 2010/0222046 A1 | 9/2010 | Cumming |
| 2011/0206198 A1 | 8/2011 | Freedman et al. |
| 2012/0151347 A1 | 6/2012 | McClements, IV |
| 2013/0031208 A1 | 1/2013 | Linton et al. |
| 2013/0332398 A1 | 12/2013 | Wu et al. |
| 2015/0199323 A1 | 7/2015 | Sultanik et al. |
| 2015/0220814 A1 | 8/2015 | Verkasalo et al. |
| 2015/0339370 A1 | 11/2015 | Onusko et al. |
| 2016/0344828 A1 | 11/2016 | Hausler et al. |

FOREIGN PATENT DOCUMENTS

| | | |
|---|---|---|
| JP | 2014-229224 A | 12/2014 |
| KR | 10-1594946 B1 | 2/2016 |
| KR | 10-1640377 B1 | 7/2016 |
| KR | 10-1653795 B1 | 9/2016 |
| KR | 10-1653797 B1 | 9/2016 |

* cited by examiner

FIG. 1

INTERACTIVE CONTENT interaction#1
(T#1, R#1, O#1)

interaction#2
(T#2, R#2, R#3, O#1)

interaction#3
(T#3, R#4, R#5, O#2)

interaction#4
(T#4, R#5, O#4)

interaction#5
(T#5, R#1, R#2, O#3)

interaction#6
(T#6, R#1, R#2, R#5, O#4)

interaction#7
(T#7, R#4, O#2)

interaction#8
(T#8, R#5, R#6, O#2, O#3, O#5, O#6)

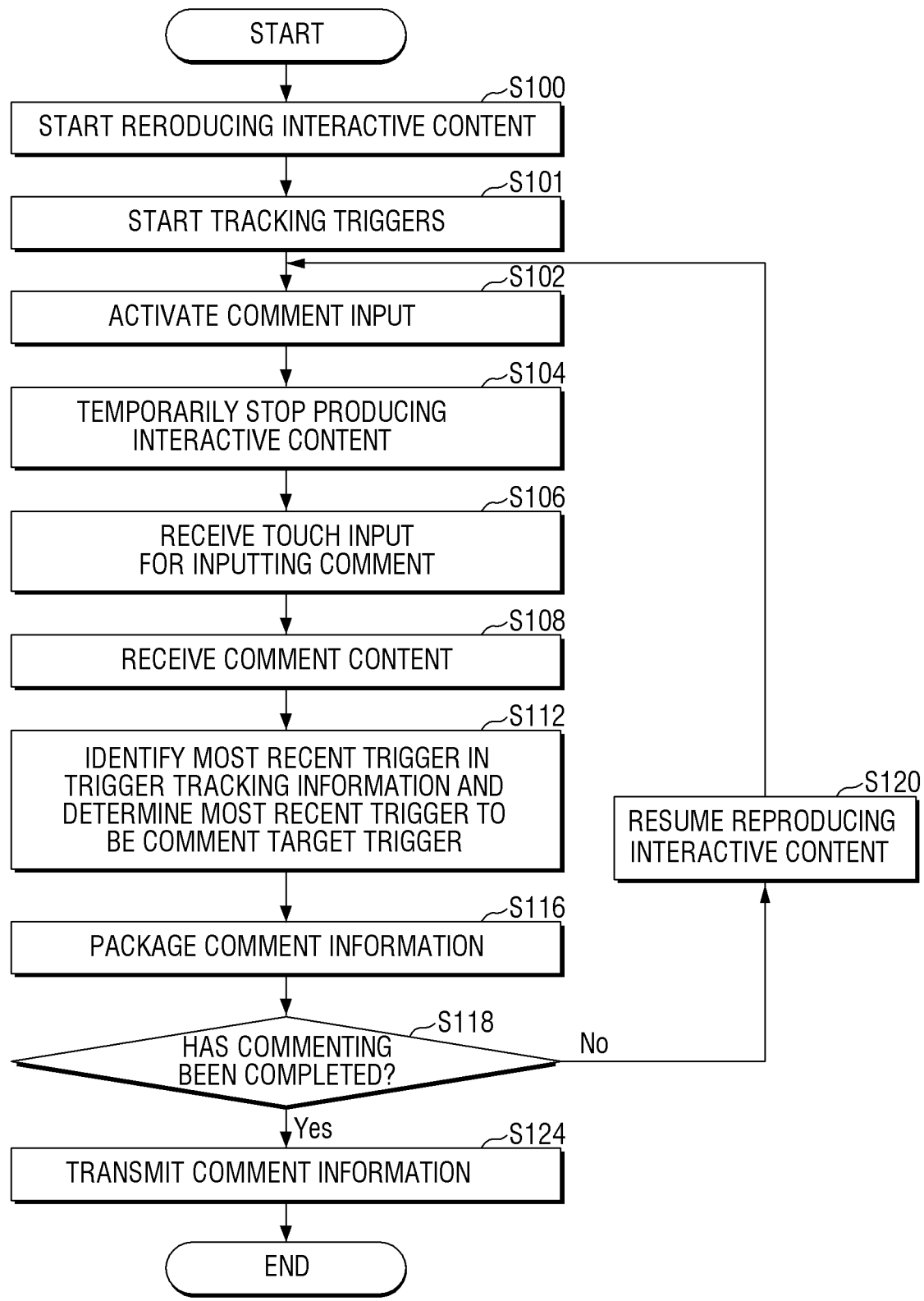

METHOD FOR ADDING A COMMENT TO INTERACTIVE CONTENT BY REPRODUCING THE INTERACTIVE CONTENT IN ACCORDANCE WITH A BRACHED COMMENT SCENARIO

CROSS-REFERENCE TO RELATED APPLICATIONS

The present application is a continuation of U.S. patent application Ser. No. 15/395,626, filed on Dec. 30, 2016; the entire contents of which are incorporated herein by reference.

BACKGROUND

1. Field

The present inventive concept relates to a method of commenting on interactive content and a method of reenacting a comment scenario, and more particularly, to a method of enabling a reviewer to easily add a comment to interactive content and a method of reenacting a comment scenario so that the author of the interactive content can accurately grasp the intent of the comment.

2. Description of the Related Art

Interactive content is distinguished from general content in that a different story line can be developed depending on a viewer's input. In a situation where the reviewer has to add a comment to content, a comment target in general content can be specified simply by adding a comment to a specific point in time on the timeline. On the other hand, a comment target in interactive content cannot be clearly specified by adding a comment to a specific point in time on the timeline.

SUMMARY

Aspects of the inventive concept provide a method of enabling a reviewer to easily add a comment to interactive content having various story scenarios according to the selective occurrence of triggers, a content reproduction apparatus which provides the above function, and computer software which provides the above function.

Aspects of the inventive concept also provide a method of reenacting a comment scenario to help the author of interactive content to clearly grasp the meaning of a comment added by a reviewer of the interactive content, a content authoring apparatus which provides the above function, and computer software which provides the above function.

Aspects of the inventive concept also provide a method of processing a request for the export of interactive content from a content authoring apparatus to a content reproduction apparatus, receiving comment information from the content reproduction apparatus and generating a comment scenario using the comment information and data on the interactive content, and an interworking server which provides the above function.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

In some embodiments, a method for commenting on interactive content is provided, the method comprises reproducing, by a content reproduction apparatus, the interactive content in accordance with a branched scenario including a plurality of branches, each branch of the branched scenario is matched to a trigger so that the interactive content is reproduced according to detections of triggers, receiving, while the interactive content is being reproduced, by the content reproduction apparatus, a touch input for inputting a comment on the interactive content, selecting, by the content reproduction apparatus, a comment target trigger, which is detected immediately before the touch input for the comment is detected, from the triggers, matching, by the content reproduction apparatus, the comment to the selected comment target trigger, determining, by the content reproduction apparatus, a comment target object, which is an object located closest to a touch point at the time when the touch input is made among candidate objects related to the comment target trigger, the candidate objects comprise objects of a response being reproduced at the time when the touch input is made, among all responses of the comment target trigger; and transmitting, by the content reproduction apparatus, comment information comprising information of the comment target trigger, a trigger log and content data of the comment.

In some embodiments, a non-transitory computer readable medium storing a program is provided, the program executes the steps of reproducing, by a content reproduction apparatus, a interactive content in accordance with a branched scenario including a plurality of branches, each branch of the branched scenario is matched to a trigger so that the interactive content is reproduced according to detections of triggers, receiving, while the interactive content is being reproduced, by the content reproduction apparatus, a touch input for inputting a comment on the interactive content, selecting, by the content reproduction apparatus, a comment target trigger, which is detected immediately before the touch input for the comment is detected, from the triggers, matching, by the content reproduction apparatus, the comment to the selected comment target trigger, determining, by the content reproduction apparatus, a comment target object, which is an object located closest to a touch point at the time when the touch input is made among candidate objects related to the comment target trigger, the candidate objects comprise objects of a response being reproduced at the time when the touch input is made, among all responses of the comment target trigger, and transmitting, by the content reproduction apparatus, comment information comprising information of the comment target trigger, a trigger log and content data of the comment.

BRIEF DESCRIPTION OF THE DRAWINGS

These and/or other aspects will become apparent and more readily appreciated from the following description of the embodiments, taken in conjunction with the accompanying drawings in which:

FIG. 1 is a conceptual diagram of interactive content composed of one or more interactions, which is referred to in some embodiments of the inventive concept;

FIG. 7 is a first flowchart illustrating a method of commenting on interactive content according to an embodiment of the inventive concept;

DETAILED DESCRIPTION

Figure 2:
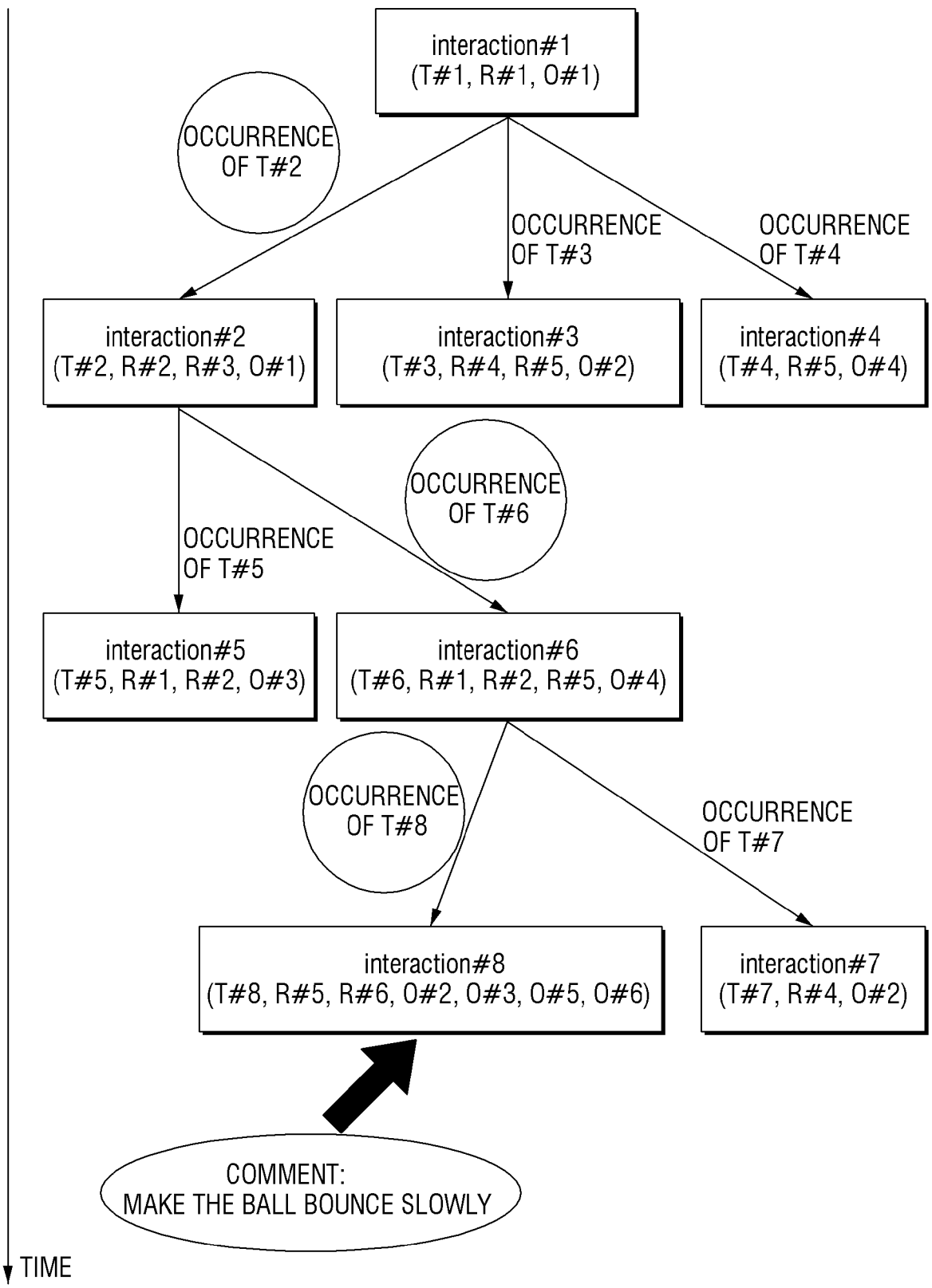
FIG. 2 illustrates a process of constructing a branched scenario for the interactive content of FIG. 1 and a process of inputting a comment while a specific response is being reproduced.

Embodiments of the present inventive concept will hereinafter be described in detail with reference to the attached drawings. The advantages and features of the present inventive concept and methods for accomplishing the same will become apparent by referring to the preferred embodiments thereof described below with reference to the attached drawings. The present inventive concept may, however, be embodied in different forms and should not be construed as limited to the embodiments set forth herein. Rather, these embodiments are provided so that this disclosure will be thorough and complete, and the present inventive concept will be defined by the scope of claims. Through out the description, identical reference numerals are used to designate identical elements.

Unless defined otherwise, all terms (including technical and scientific terms) used herein have the same meaning as commonly understood by one of ordinary skill in the art to which the present inventive concept belongs. Further, unless expressly defined otherwise, all terms defined in generally used dictionaries may not be interpreted in an idealized or overly sense. It will also be understood that the terms may be used herein to describe embodiments, and may not intended to limit the scope of the present disclosure. As used herein, the singular forms are intended to include the plural forms as well, unless the context clearly indicates otherwise.

Hereinafter, embodiments of the inventive concept will be described with reference to the drawings.

First, the meaning of 'interactive content' used herein will be described with reference to FIG. 1. Interactive content is distinguished from general content in that a different story line can be developed depending on a viewer's input. In the case of the general content, there is no interaction with the viewer. Therefore, only one linear story line is developed. On the other hand, the interactive content is branched off into stories by a trigger that occurs according to a viewer's user input or the surrounding situation or environment at the time of reproduction. Therefore, various story lines can be created.

Interactive content of the present specification is content that includes one or more interactions. The interactive content may include various metadata besides data about the interactions. Therefore, content including data besides data about interactions does not deviate from the scope of the interactive content of the present specification.

An interaction is data that defines how an object included in the interactive content reacts when there is an input to the interactive content. In the present specification, the input to the interactive content is referred to as a trigger. The trigger may be, for example, a touch input to a touch screen included in an apparatus in which the interactive content is being reproduced, a trigger event generated based on measurement data sensed through a sensor (e.g., a camera, a microphone, an illuminance sensor, an acceleration sensor, a gyroscope, a proximity sensor, a geomagnetic sensor, or the like) included in the apparatus in which the interactive content is being reproduced, a trigger event generated based on positioning data measured by a positioning device of the apparatus in which the interactive content is being reproduced, or a trigger event indicating that specific data has been received from an external device wiredly or wirelessly connected to the apparatus in which the interactive content is being reproduced.

The trigger may be identified based on the assumption that it occurs for a particular object or a particular object set. The particular object set may be a set of adjacent objects constituting one layer. For example, trigger #1 may indicate a tap (touch) on object #1, and trigger #2 may indicate a tap on object #2.

In the present specification, the response of the interactive content to the occurrence of the trigger is referred to as a response. The response is reproduced for one or more objects. The objects are referred to as response target objects. The objects are visual components constituting the interactive content.

The interactive content includes a screen on which one or more objects are overlaid and displayed in a multi-layer manner. For the multi-layer, the objects may be prioritized. In other words, when display areas overlap, an object with a higher priority hides an object with a lower priority.

FIG. 1 illustrates interactive content composed of a total of eight interactions interaction #1 through interaction #8. In FIG. 1, a trigger is indicated by 'T', a response is indicated by 'R', and an object is indicated by 'O'. Interaction #1 indicates that response R #1 is reproduced for object O #1 when trigger T #1 occurs. Interaction #2 indicates that response R #2 and response R #3 are reproduced for object O #1 when trigger T #2 occurs. In addition, interaction #6 indicates that response R #1 and response R #5 are reproduced for object O #5 and object O #4, respectively, when trigger T #6 occurs.

FIG. 2 illustrates a process of constructing a branched scenario for the interactive content of FIG. 1 and a process of inputting a comment while a specific response is being reproduced. As illustrated in FIG. 2, interactive content of the present specification is branched scenario-type content defined such that a plurality of triggers can occur in at least some situations. The 'situation' denotes a time when a trigger can occur. The situation may denote a time after the reproduction of a response is completed. Alternatively, a trigger can occur even during the reproduction of a response.

The interactive content illustrated in FIG. 2 is branched scenario-type content and defined such that one or more of interaction #2, interaction #3 and interaction #4 occurs after interaction #1, that one or more of interaction #5 and interaction #6 occurs after interaction #2, and that one or more of interaction #7 and interaction #8 occurs after interaction #6.

The interactive content of the present specification may be, for example, an interaction prototype for graphic user interface (GUI)-based software.

In a case where interaction #2 is reproduced in response to the occurrence of a trigger #2 after interaction #1, where interaction #6 is reproduced in response to the occurrence of trigger #6, and where a reviewer inputs a comment while interaction #8 is being reproduced in response to the occurrence of trigger #8, a method of processing a comment and a method of reenacting the comment according to embodiments of the inventive concept will hereinafter be described. It is assumed that, in interaction #8, response #5 and response #6 occur in response to the occurrence of trigger #8, target objects of response #5 are object #2, object #5 and object #6, and a target object of response #6 is object #3.

When a comment on interactive content of a branched scenario-type is input, it is very important to determine what the target of the comment is. In some embodiments of the inventive concept, the comment is matched to a comment target trigger that occurred just before a touch input for inputting the comment on the interactive content was made.

As a result, a comment scenario can be constructed by connecting a series of triggers that occurred from the start of reproduction of the interactive content to the occurrence of the comment target trigger, and responses to the triggers included in the comment scenario can be sequentially reproduced. Therefore, a target scenario in which a comment is written by a reviewer can be accurately reenacted.

In some embodiments of the inventive concept, even a comment target response and a target object of the comment target response can be predicted using a comment input time and a touch point at the comment input time without a reviewer's instructions and displayed for a user who checks comments.

Figure 3:
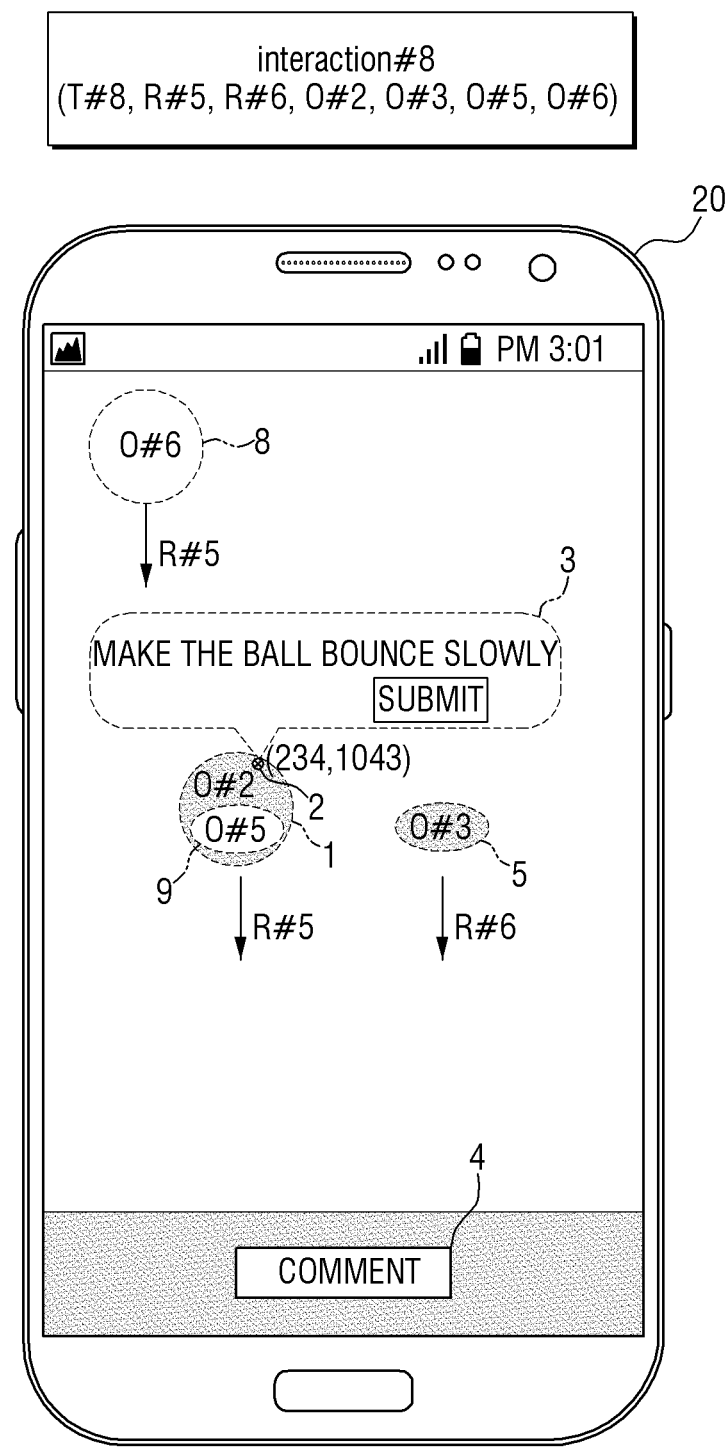
FIG. 3 is an interactive content reproduction and comment input user interface according to embodiments of the inventive concept and illustrates the process of inputting a comment described with reference to FIG. 2.

FIG. 3 illustrates a comment input user interface displayed on a content reproduction apparatus 20. On the screen of FIG. 3, interaction #8 is being reproduced. As described above, in interaction #8, when trigger #8 (e.g., a touch on the screen) occurs, response #5 (e.g., moving down) and response #6 (e.g., moving down while rotating) occur. In addition, target objects of response #5 are object #2 (1), object #5 (9), and object #6 (8), and a target object of response #6 is object #3 (5).

The content reproduction apparatus 20 may be a computing device equipped with software having an interactive content interpretation and reproduction function. The content reproduction apparatus 20 may be, for example, a mobile terminal such as a smartphone or a smart watch.

A reviewer who wishes to request the author of interactive content to modify the interactive content by writing a comment on the interactive content may designate a comment input time by pressing a comment button 4 while manipulating the interactive content through a trigger input to the interactive content. When the comment button 4 is pressed, all responses may pause, thus making it easy to designate a comment target touch point. In a state where all objects on the screen are stopped because all the responses pause, the reviewer may touch the comment target touch point. When a specific point on the screen is touched, a user interface (UI) 3 for inputting a comment may be displayed based on the specific point.

When a comment is input through the UI 3 for inputting a comment, the content reproduction apparatus 20 constructs comment information. The comment information includes information about a comment target trigger, a trigger log, and content data of the comment. The comment target trigger is the most recent trigger that occurred before the comment input button 4 was pressed.

The trigger log is a set of triggers that occurred for the interactive content from a specific time after the reproduction of the interactive content started to when the comment target trigger occurred. To construct the trigger log, the content reproduction apparatus 20 may track the occurrence of triggers from when the reproduction of the interactive content starts.

In an embodiment, the trigger log may include all triggers ranging from a trigger that occurred first after the start of reproduction of the interactive content to the comment target trigger. In this case, the situation until a comment is input can be reproduced most accurately.

In an embodiment, the trigger log may include not all of the triggers ranging from the trigger that occurred first after the start of reproduction of the interactive content to the comment target trigger. Instead, the trigger log may just be a set of triggers that occurred for the interactive content from a specific time after the reproduction of the interactive content started to when the comment target trigger occurred. For example, the trigger log may be a set of a predetermined number (e.g., five) of triggers that occurred before the comment target trigger. When the reviewer inputs a comment after manipulating the interactive content for a long time, reenacting all the triggers that occurred from the reproduction time of the interactive content to the occurrence of the comment target trigger may be inefficient in terms of data size and time taken to check the comment. If the situation before the occurrence of the comment target trigger can be identified to an appropriate level, it will be enough to grasp the intention of the reviewer. Thus, the current embodiment may reduce the data size of the comment information to help speed up comment processing.

The criterion for determining the comment target trigger has already been described. Additionally, it may be desirable to provide information about a comment target response and a comment target object to a user who checks comments in order to accurately convey the content of a comment.

In an embodiment, the comment target response may be all responses to the comment target trigger.

A comment is not likely to be input for a response not being reproduced. Therefore, in an embodiment, the comment target response may be limited to a response being reproduced at a time when the comment button 4 is pressed, among all responses to the comment target trigger.

Further, the comment target object may be determined using a touch point 2 of a comment. For example, of candidate objects related to the comment target trigger, an object located closest to the touch point 2 at a time when a touch input for inputting the comment is made may be determined to be the comment target object. The candidate objects include objects of all responses to the comment target trigger. Also, as described above, the candidate objects may be responses being reproduced at the time when the comment button 4 is pressed, among all responses to the comment target trigger.

In an embodiment, the candidate objects may include objects selected from the objects of the responses to the comment target trigger based on transparency at the time when the touch input is made. For example, of the four objects 1, 5, 8 and 9 illustrated in FIG. 3, object O #6 (8) is currently in a state where its attribute value is set to complete transparency. Since a comment is not likely to be input for an object currently not visible, an object that is transparent at the time when the touch input is made may be excluded from the candidate objects.

In an embodiment, the candidate objects may include objects that are at least partially unhidden by other objects at a time when a touch input for inputting a comment is made among the objects of the responses to the comment target trigger. For example, object O #5 (9) illustrated in FIG. 3 has a lower priority than object O #2 (1), and all areas of object O #5 (9) are hidden by object O #2 (1) at a time when a touch input for inputting a comment is made (when the comment button 4 is pressed in the situation of FIG. 3). Therefore, object O #5 (9) may be excluded from the candidate objects.

In summary, in the situation illustrated in FIG. 3, a comment target response is initially determined to be response #5 and response #6 which were being reproduced when the comment input button 4 was pressed. Therefore, a comment target object is determined from among object O #2 (1), object O #5 (9) and object O #6 (8) which are objects of response #5 and object O #3 (5) which is an object of response #6. Here, object O #6 (8), which is a transparent object, and object O #5 (9), which is completely hidden by another object, are excluded from candidates for the comment target object. Of the remaining objects O #2 (1) and O #3 (5), object O #2 (1) which is located closest to the touch point (2) of the comment is determined to be the comment target object Then, the comment target response is adjusted to response #5 which is a response of the comment target object.

The above-described operation of determining a comment target response and a comment target object based on a touch point may be performed by a content reproduction apparatus, by an interworking server which receives information about the touch point from the content reproduction apparatus, or by a content authoring apparatus which is provided with the information about the touch point and a comment scenario.

In an embodiment, a touch input predefined for comment input may be used to input a comment, instead of the comment button 4. Here, the predefined touch input may be, for example, a double touch (two touches at the same touch point within a short time). In this case, the predefined touch input should be input to a comment target touch point. When the predefined touch input is detected, the UI 3 for inputting a comment may be displayed based on the comment target touch point. According to the current embodiment, comment content can be input immediately with only one touch input.

Figure 4:
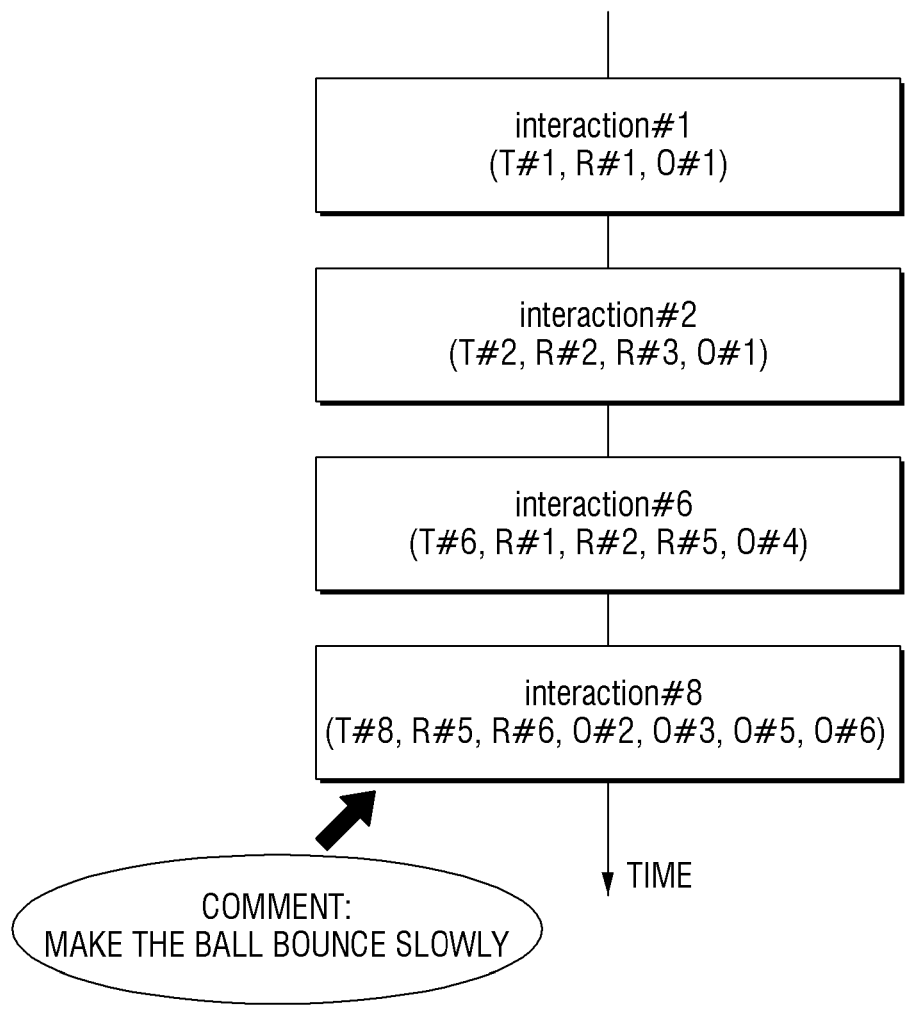
FIG. 4 illustrates a comment scenario constructed according to embodiments of the inventive concept, specifically, a comment scenario constructed when a comment is input as described with reference to FIGS. 2 and 3.

FIG. 4 illustrates a comment scenario constructed according to embodiments of the inventive concept. In FIG. 4, a comment scenario constructed when a comment is input as described above with reference to FIGS. 2 and 3 is illustrated.

In an embodiment, the comment scenario may be a scenario in which interaction #1, interaction #2, interaction #6 and interaction #8 that occurred for interactive content are sequentially connected.

In an embodiment, the comment scenario may be a scenario in which triggers that occurred for the interactive content from a specific time after the reproduction of the interactive content started to when a comment target trigger occurred are sequentially connected. Here, the comment scenario may include data that causes content data of the comment to be displayed in a reproduction section of a response to the comment target trigger.

In an embodiment, the comment scenario may be a scenario in which responses to triggers that occurred for the interactive content from a specific time after the reproduction of the interactive content started to when the comment target trigger occurred are sequentially connected. The comment scenario may include data that causes the content data of the comment to be displayed in a reproduction section of a response to the comment target trigger. However, when the comment scenario is created, if there are some responses among a plurality of responses are repeated or duplicated in response to a specific trigger on a response reproduction timeline, the responses may be repeated or duplicated when the some responses are reproduced.

Figure 5A:
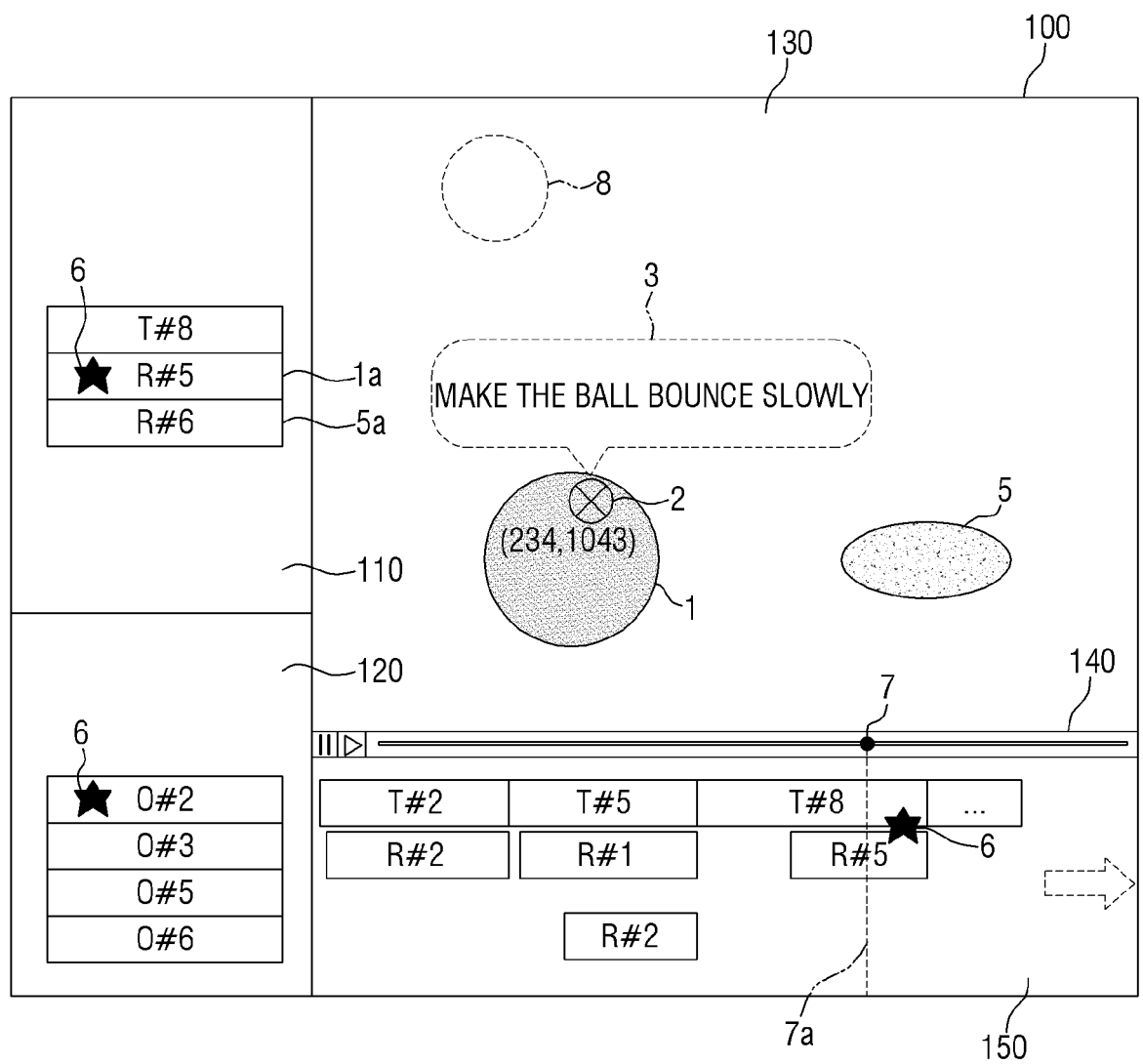
FIG. 5A illustrates a comment viewing user interface of a content authoring apparatus configured according to embodiments of the inventive concept, on which the comment scenario described with reference to FIG. 4 is reenacted.

FIG. 5A illustrates a comment viewing user interface 100 of a content authoring apparatus configured according to embodiments of the inventive concept. In FIG. 5A, the comment scenario described above with reference to FIG. 4 is reenacted. Referring to FIG. 5A, the comment viewing user interface 100 may include a reenacting panel 130, a trigger/response display panel 110, an object display panel 120, a slider bar area 140, and a trigger/response streaming area 150 in which a response on a timeline currently being reenacted and a trigger that caused the response are updated.

A user (e.g., a designer of interactive content) who wishes to check a comment written by a reviewer may reenact a comment situation through the comment viewing user interface 100. The reenacting of the comment situation may be performed by freely moving through the timeline of the comment scenario using a slider button 7 which indicates the timeline. While the comment situation is being reenacted, if the time when the comment was input comes, content 3 of the comment may be displayed, and a touch point 2 of the comment may also be displayed. In order to facilitate the understanding of the user who checks the comment, a trigger at the time currently being reproduced and responses to the trigger are updated in the trigger/response display panel 110, and objects displayed on the reenacting panel 130 at the time currently being reproduced are updated in the object display panel 120.

In an embodiment, not only the situation before the input of the comment but also the situation after the input of the comment may be displayed. To this end, comment information may further include information about a predetermined number of triggers that occurred after the occurrence of a comment target trigger and responses to the triggers.

In an embodiment, when the comment scenario is opened through the comment viewing user interface 100, a comment input time 7a may be set to a current timeline by default. If the user who checks the comment can clearly grasp the content of the comment simply by viewing the comment input time, the time required to check the comment may be saved.

In an embodiment, the comment scenario may further include identification information of the comment target trigger and at least one of identification information of a comment target response and identification of a comment target object. In this case, to facilitate the understanding of the user which checks the comment, marks 6 indicating the comment target response and the comment target object may be displayed on the comment viewing user interface 100 as illustrated in FIG. 5A.

Figure 5B:
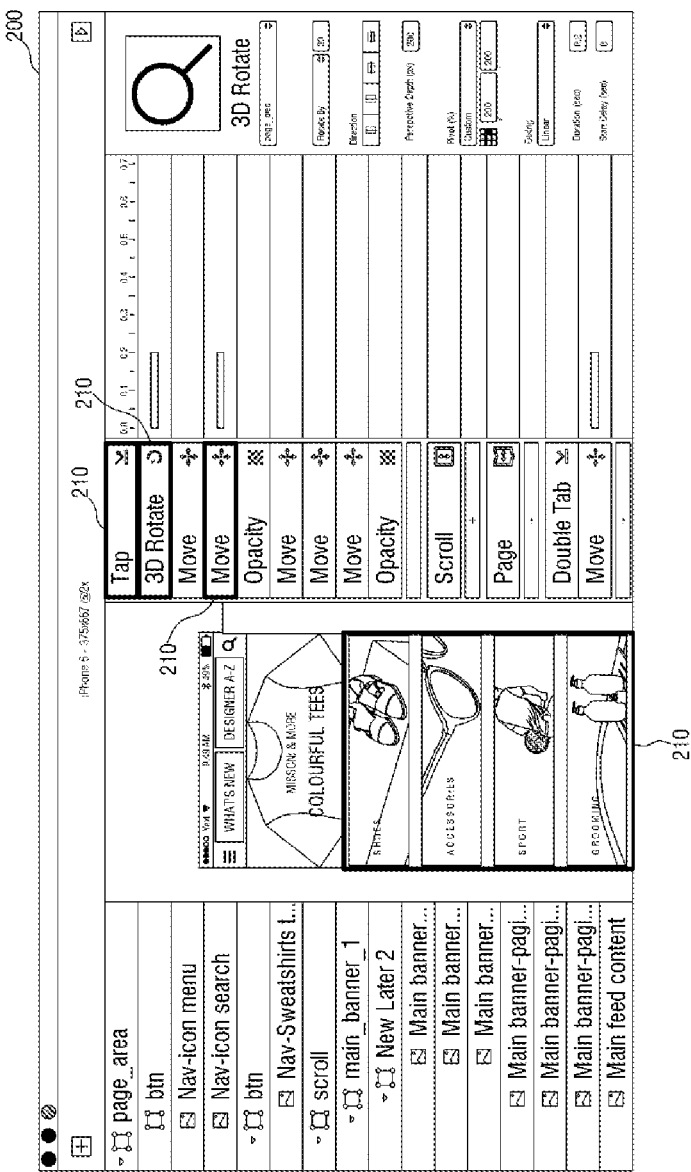
FIGS. 5B and 5C illustrate example screens displayed on an interactive content authoring tool when the comment viewing user interface of FIG. 5A and the interactive content authoring tool interwork with each other.
Figure 5C:
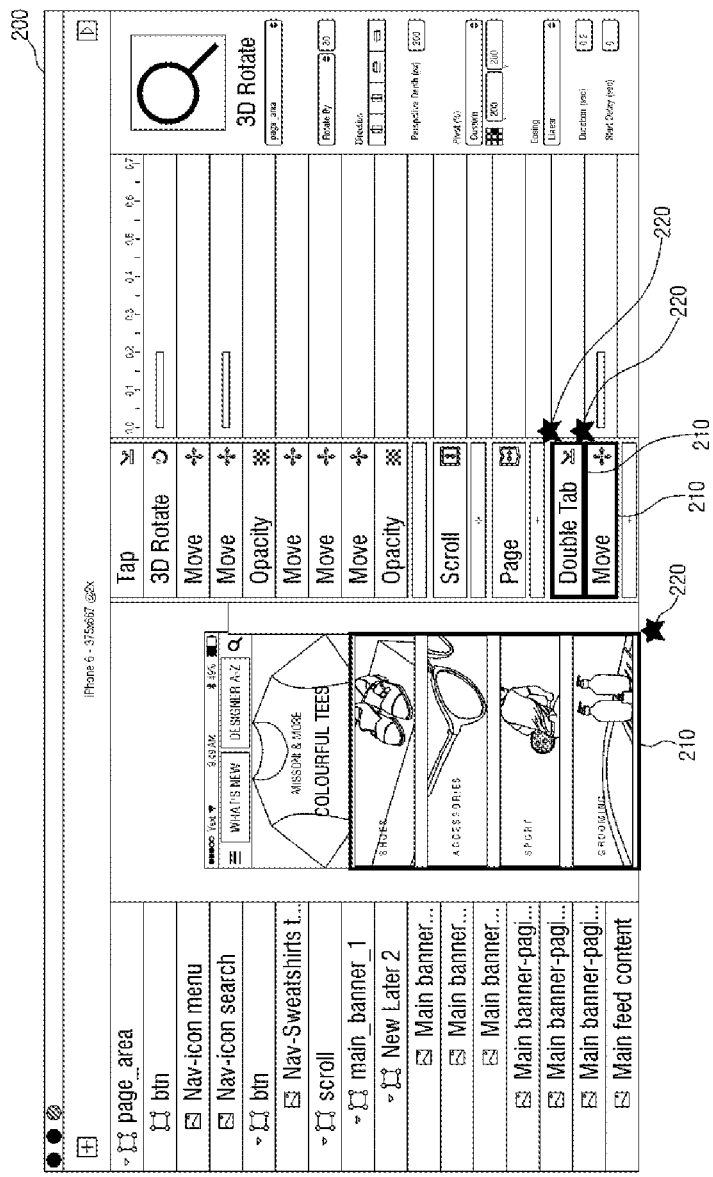

In an embodiment, an interactive content authoring tool 200 may interwork with the comment viewing user interface 100. FIGS. 5B and 5C are example screens displayed on the interactive content authoring tool 200 when the comment viewing user interface 100 of FIG. 5A and the interactive content authoring tool 200 interwork with each other. When the interactive content authoring tool 200 interworks with the comment viewing user interface 100, indicators 210 indicating objects, triggers and objects displayed on the reenacting panel 130 at a timeline currently being reproduced may be displayed on the interactive content authoring tool 200. In addition, when the objects, triggers, and objects displayed on the reenacting panel 130 are updated as the reproduction proceeds, the indicators 210 and marks 220 may be refreshed to indicate the updated objects, triggers, and objects. For example, FIG. 5B illustrates the indicators 210 at a first reproduction time, and FIG. 5C illustrates the indicators 210 of a second reproduction time, which is a reproduction time after the first reproduction time, and marks 220 indicating comment targets.

In an embodiment, the comment viewing user interface 100 may be implemented within the interactive content authoring tool 200. In this case, the same operation may be performed as in the case where the interactive content authoring tool 200 is linked with the comment viewing user interface 100.

The structure and operation of an interactive content commenting system according to an embodiment of the inventive concept will hereinafter be described.

Figure 6A:
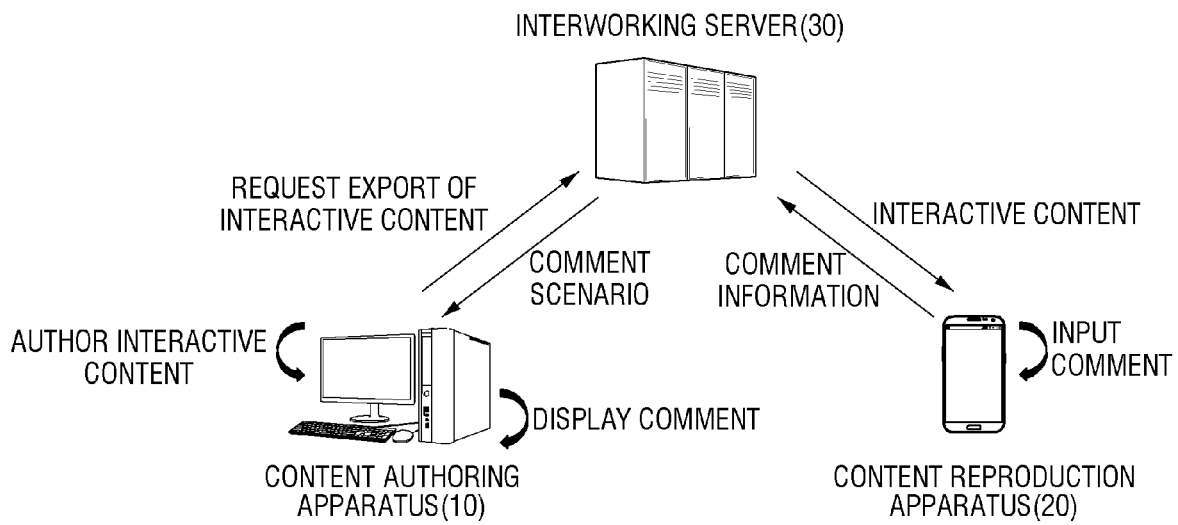
FIG. 6A illustrates the configuration of an interactive content commenting system according to an embodiment of the inventive concept.

Referring to FIG. 6A, the interactive content commenting system may include an interworking server 30, a content authoring apparatus 10, and a content reproduction apparatus 20.

The content reproduction apparatus 20 receives a touch input for inputting a comment on interactive content, matches the comment to a comment target trigger that occurred immediately before the touch input was made among triggers of the interactive content, and transmits comment information including information about the comment target trigger, a trigger log and content data of the comment to the interworking server 30. Here, the trigger log is a set of triggers that occurred for the interactive content from when the reproduction of the interactive content started until the comment target trigger was generated.

The interworking server 30 receives the comment information from the content reproduction apparatus 20 and generates a comment scenario by connecting the triggers included in the trigger log of the comment information according to the order in which the triggers occurred. Here, the comment scenario includes data that causes the content data of the comment to be displayed in a reproduction section of a response to the comment target trigger. The interworking server 30 transmits the comment scenario to the content authoring apparatus 10 equipped with an authoring tool for creating the interactive content.

The content authoring apparatus 10 is equipped with the authoring tool for authoring the interactive content. The content authoring apparatus 10 may export the interactive content to the content reproduction apparatus 20 via the interworking server 30 and receive the comment scenario as feedback. The content authoring apparatus 10 may reproduce the comment scenario as described above with reference to FIGS. 5A through 5C.

Figure 6B:
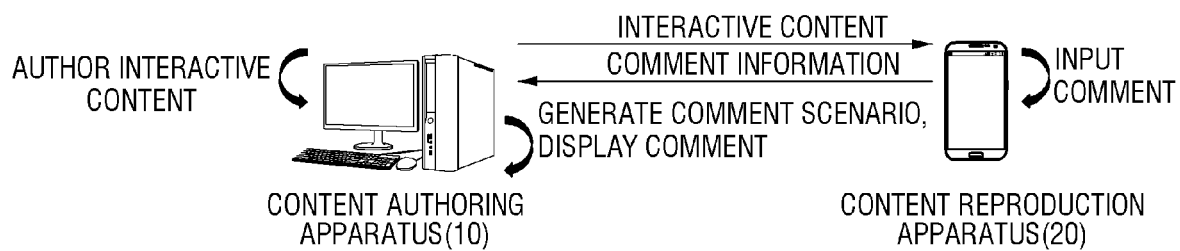
FIGS. 6B and 6C illustrate the configuration of an interactive content commenting system according to an embodiment of the inventive concept.

In an interactive content commenting system according to an embodiment of the inventive concept, the content authoring apparatus 10 and the content reproduction apparatus 20 may be directly connected to each other, not via the interworking server 30. In this case, the content authoring device 10 and the content reproducing device 20 may be connected through a short-range communication network such as Bluetooth or Wi-Fi. In an embodiment, the generation of the comment scenario may be performed by the content authoring apparatus 10 as illustrated in FIG. 6B.

Figure 6C:
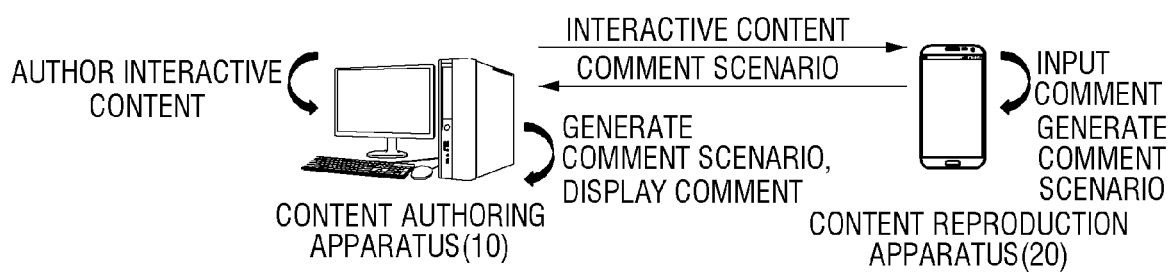

In an embodiment, the generation of the comment scenario may also be performed by the content reproduction apparatus 20 as illustrated in FIG. 6C. In this embodiment, it can be understood that the content reproduction apparatus 20 supports the function of exporting a comment scenario. A comment scenario file after the export may include comment content, a comment touch point, identification information of a comment target trigger, identification information of a comment target response, identification information of a comment target object, and identification information of a series of triggers that occurred before the comment target trigger used to identify the situation before a comment was input. In an embodiment, the comment scenario file after the export may be formed as an add-on to interactive content to be commented on. The comment scenario file after the export may be delivered to the author of the interactive content through various methods such as e-mail.

A method of commenting on interactive content according to embodiments of the inventive concept will hereinafter be described with reference to FIGS. 7 through 9. The commenting method according to the current embodiments may be performed by a computing device. For example, the flowchart of FIG. 7 may be performed by a content reproduction terminal which reproduces interactive content, the flowchart of FIG. 8 may be performed by an interworking server which relays between the content reproduction terminal and a content authoring terminal, and the flowchart of FIG. 9 may be performed by the content authoring terminal. However, the inventive concept is not based on the assumption that a comment receiving device and a comment reenacting device must be separated from each other. That is, in an embodiment, the comment receiving device and the comment reenacting device may be the same device. That is, operations illustrated in the flowcharts of FIGS. 7 through 9 can all be performed by the same computing device. For example, if the interactive content is a GUI prototype, when a prototype designer completes a draft of a prototype design, the prototype designer may test the draft by exporting the draft, leave a comment in the test process, and increase the completeness of the prototype as the comment is later reenacted on the same device.

Also, as described above, the content reproduction apparatus and the content authoring apparatus can be directly connected to each other. In this case, the operations illustrated in the flowchart of FIG. 7 may be performed by the content reproduction apparatus, and the operations illustrated in the flowcharts of FIGS. 8 and 9 may be performed by the content authoring apparatus. In addition, the operations illustrated in the flowcharts of FIG. 7 and FIG. 8 may be performed by the content reproduction apparatus, and the operations illustrated in the flowchart FIG. 9 may be performed by the content authoring apparatus.

A method of commenting on interactive content according to embodiments of the inventive concept will be described with reference to FIG. 7. To avoid confusion of understanding due to a redundant description, a detailed description of related operations already described above will be omitted.

After the reproduction (or manipulation) of interactive content is started (operation S100), the tracking of triggers that occurred in the interactive content is started (operation S101). The tracking of the triggers is to record triggers that occurred. When a comment input is activated by a touch on a comment input button or a touch input defined as an input for inputting a comment (operation S102), the reproduction of the interactive content is temporarily stopped (operation S104). Although the comment input has been activated by the touch on the comment input button, if a comment touch point has not yet been designated, a touch input for the touch point is received (operation S106). Then, comment content is received (operation S108). The comment content may be text or voice.

When the comment content is completely received, a trigger that occurred most recently is identified in information about triggers that have occurred and been tracked so far, and the most recent trigger is determined to be a comment target trigger (operation S112). Next, comment information is packaged (constructed) (operation S116). The comment information may include comment content, a comment touch point, identification information of a comment target trigger, identification information of a comment target response, identification information of a comment target object, and a trigger log. The trigger log may include identification information of a series of triggers that occurred before the comment target trigger used to identify the situation before the comment input. For example, the trigger log may include all of a series of triggers that occurred from the start of reproduction of the interactive content to the occurrence of the comment target trigger or may include a predetermined number of triggers that occurred before the comment target trigger.

Since a comment is likely to be input a plurality of times, the reproduction of the interactive content is restarted (operation S120) unless there is a user input indicating the completion of commenting (operation S118). If there is a user input indicating the completion of commenting, the comment information of the input comments is transmitted (operation S124). As described above, the comment information is transmitted to an apparatus for generating a comment scenario. For example, the comment information may be transmitted to the interworking server or the content authoring apparatus.

Figure 8:
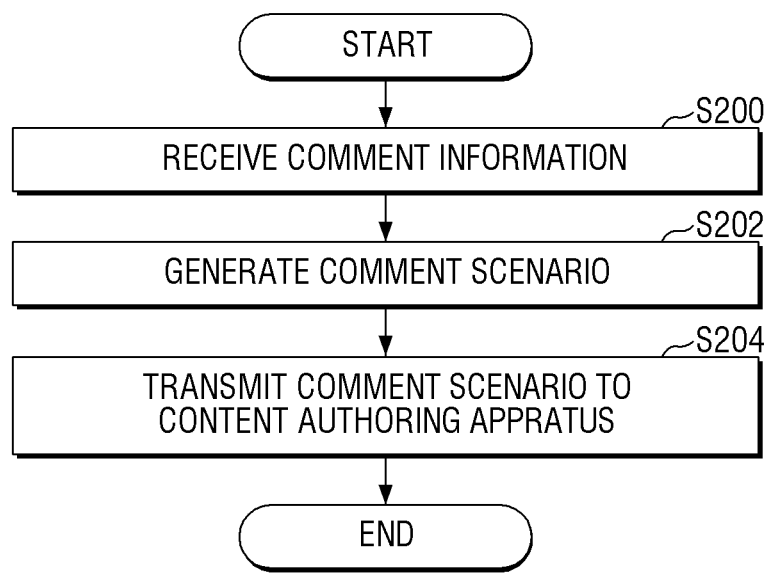
FIG. 8 is a second flowchart illustrating the method of commenting on interactive content according to the embodiment of the inventive concept.
Figure 9:
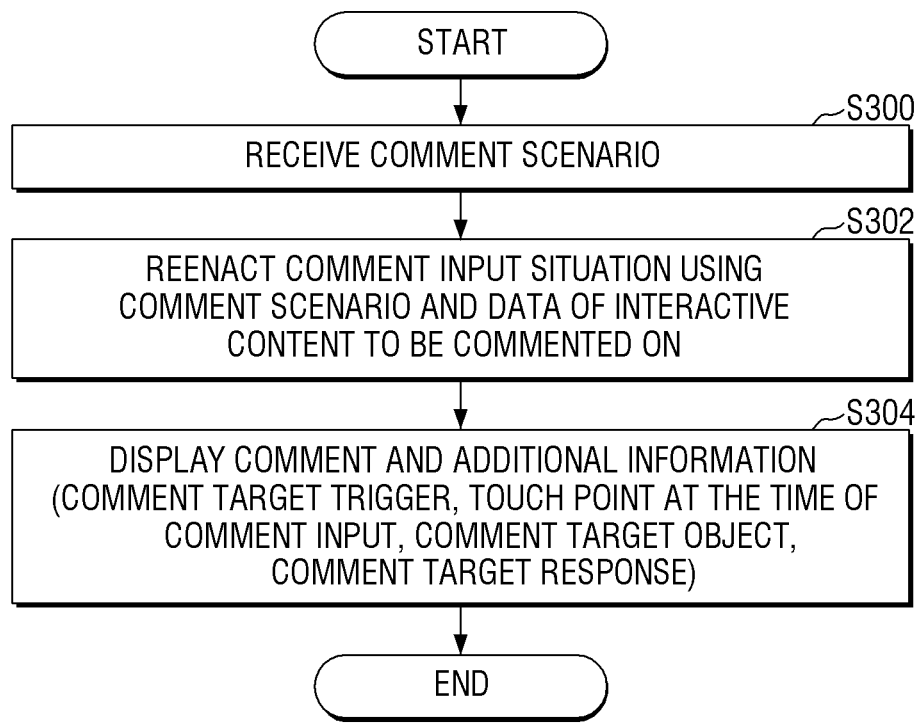
FIG. 9 is a third flowchart illustrating the method of commenting on interactive content according to the embodiment of the inventive concept.

In FIG. 8, the comment information is received (operation S200), a series of triggers included in the trigger log of the comment information are connected in chronological order to generate a comment scenario (operation S202), and the comment scenario is transmitted to the content authoring apparatus. In addition, in FIG. 9, the comment scenario is received (operation S300), and the situation in which a comment was input is reenacted using the comment scenario and data of the interactive content to be commented on (operation S302), and the comment content and additional information are displayed when a timeline of the comment scenario matches the input time of the comment (operation S304). The result of the operations of FIG. 9 is illustrated in FIGS. 5A through 5C.

The methods according to the embodiments described until now may be performed by the execution of a computer program implemented as computer-readable code. The computer program may be transmitted from a first computing device to a second computing device through a network such as the Internet and then installed in the second computing device for use. Each of the first computing device and the second computing device may be a fixed computing device such as a server, a physical server that belongs to a server pool for a cloud service, or a desktop PC.

The computer program may be stored in a recording medium such as a DVD-ROM, a flash memory device, or the like.

The configuration and operation of an interworking server 30 for commenting on interactive content according to an embodiment of the inventive concept will hereinafter be described with reference to FIG. 10.

Figure 10:
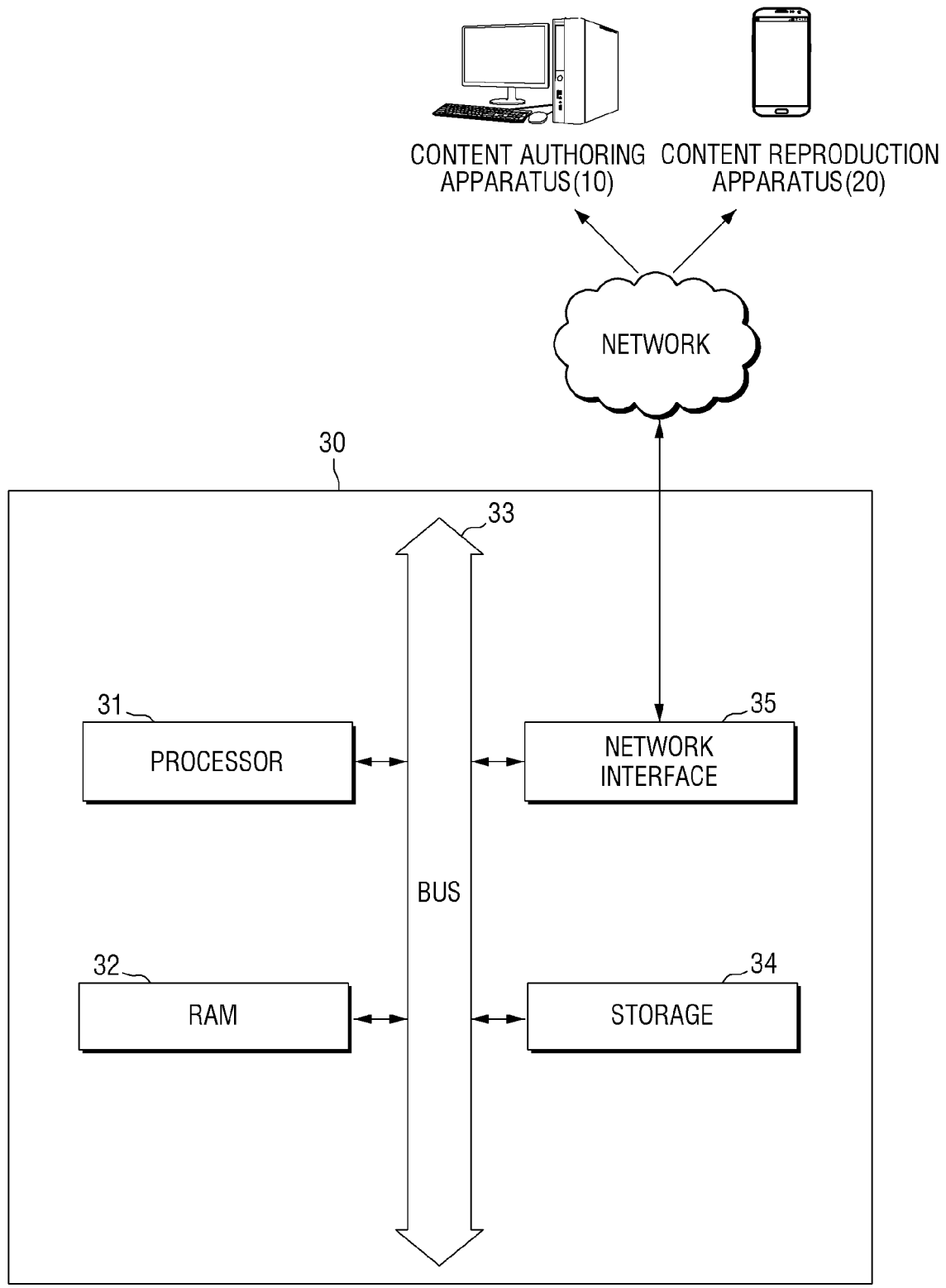
FIG. 10 illustrates the configuration of an interworking server for commenting on interactive content according to an embodiment of the inventive concept.

Referring to FIG. 10, the interworking server 30 for commenting on interactive content according to the current embodiment includes a processor 31, a storage 34 which stores an interworking program for commenting on interactive content, a memory 32 which loads a plurality of operations executed by the processor 31 to implement the program from the storage 34, a network interface 35 which is connected to a content reproduction apparatus 20 for reproducing the interactive content and a content authoring apparatus 10 equipped with an authoring tool for generating the interactive content and exporting the interactive content to the content reproduction apparatus 20, and a system bus 33 which is connected to the processor 31, the memory 32, the storage 34 and the network interface 35 so as to relay data transmission and reception.

The operations may include an operation of receiving comment information about the interactive content from the content reproduction apparatus 20. The comment information includes information about a comment target trigger, a trigger log, and content data of a comment. The trigger log is a set of triggers that occurred for the interactive content from a specific time after the reproduction of the interactive content started to when the comment target trigger occurred.

The operations may further include an operation of generating a comment scenario by connecting responses to the triggers included in the trigger log according to the order in which the triggers occurred. Here, the comment scenario includes data that causes the content data of the comment to be displayed in a reproduction section of a response to the comment target trigger.

The operations may further include an operation of transmitting the comment scenario to the content authoring apparatus 10.

What is claimed is:

1. A method for commenting on interactive content, the method comprising:
    reproducing, by a content reproduction apparatus, the interactive content in accordance with a branched scenario including a plurality of branches, each branch of the branched scenario is matched to a trigger so that the interactive content is reproduced according to detections of triggers;
    receiving, while the interactive content is being reproduced, by the content reproduction apparatus, a touch input for inputting a comment on the interactive content;
    selecting, by the content reproduction apparatus, a comment target trigger, which is detected immediately before the touch input for the comment is detected, from the triggers;
    matching, by the content reproduction apparatus, the comment to the selected comment target trigger;
    determining, by the content reproduction apparatus, a comment target object, which is an object located closest to a touch point at the time when the touch input is made among candidate objects related to the comment target trigger, the candidate objects comprise objects of a response being reproduced at the time when the touch input is made, among all responses of the comment target trigger; and
    transmitting, by the content reproduction apparatus, comment information comprising information of the comment target trigger, a trigger log and content data of the comment.

2. The method of claim 1, wherein the reproducing the interactive content comprises tracking triggers which are occurred from the reproducing of the interactive content started.

3. The method of claim 2, wherein the trigger log is a set of triggers, which are detected from when the reproducing of the interactive content started to when the comment target trigger is detected.

4. The method of claim 2, wherein the trigger log is a set of triggers that occurred from a specific time after the reproducing of the interactive content started to when the comment target trigger is detected.

5. The method of claim 2, wherein the trigger log is a set of a predetermined number of triggers that occurred before the comment target trigger.

6. The method of claim 1, wherein the reproducing the interactive content comprises detecting the trigger which is a touch input to a touch screen included in the content reproduction apparatus.

7. The method of claim 1, wherein the reproducing the interactive content comprises detecting the trigger which is a trigger event generated based on measurement data sensed through a sensor included in the content reproduction apparatus.

8. The method of claim 1, wherein the reproducing the interactive content comprises detecting the trigger which is a trigger event generated based on positioning data measured by a positioning device in the content reproduction apparatus.

9. The method of claim 1, wherein the reproducing the interactive content comprises detecting the trigger which is a trigger event indicating that specific data has been received from an external device wiredly or wirelessly connected to the content reproduction apparatus.

10. The method of claim 1, wherein the receiving the touch input for inputting a comment comprises stopping the reproducing the interactive content temporarily.

11. The method of claim 1, wherein the candidate objects comprise objects selected from the objects of the response to the comment target trigger based on transparency at the time when the touch input is made.

12. The method of claim 1, wherein the candidate objects comprise objects at least partially unhidden by other objects at the time when the touch input is made among the objects of the response to the comment target trigger.

13. The method of claim 1, wherein the transmitting comment information comprises receiving a user input indicating the completion of commenting.

14. The method of claim 1, wherein the interactive content includes a screen on which one or more objects are overlaid and displayed in a multi-layer manner.

15. The method of claim 1, wherein the content data includes voice data.

16. A non-transitory computer readable medium storing a program for executing the steps of:
  reproducing, by a content reproduction apparatus, a interactive content in accordance with a branched scenario including a plurality of branches, each branch of the branched scenario is matched to a trigger so that the interactive content is reproduced according to detections of triggers;
  receiving, while the interactive content is being reproduced, by the content reproduction apparatus, a touch input for inputting a comment on the interactive content;
  selecting, by the content reproduction apparatus, a comment target trigger, which is detected immediately before the touch input for the comment is detected, from the triggers;
  matching, by the content reproduction apparatus, the comment to the selected comment target trigger;
  determining, by the content reproduction apparatus, a comment target object, which is an object located closest to a touch point at the time when the touch input is made among candidate objects related to the comment target trigger, the candidate objects comprise objects of a response being reproduced at the time when the touch input is made, among all responses of the comment target trigger; and
  transmitting, by the content reproduction apparatus, comment information comprising information of the comment target trigger, a trigger log and content data of the comment.

* * * * *